US012717817B2

(12) United States Patent
Kelly et al.

(10) Patent No.: US 12,717,817 B2
(45) Date of Patent: Aug. 25, 2026

(54) SYSTEMS AND METHODS FOR TIME-BASED ABNORMALITY IDENTIFICATION WITHIN UNIFORM DATASET

(71) Applicant: Optum Services (Ireland) Limited, Dublin (IE)

(72) Inventors: Damian Kelly, Kildare (IE); Julie Zhu, Minnetonka, MN (US)

(73) Assignee: Optum Services (Ireland) Limited, Dublin (IE)

(*) Notice: Subject to any disclaimer, the term of this patent is extended or adjusted under 35 U.S.C. 154(b) by 916 days.

(21) Appl. No.: 16/257,265

(22) Filed: Jan. 25, 2019

(65) Prior Publication Data

US 2020/0242506 A1 Jul. 30, 2020

(51) Int. Cl.

| | |
|---|---|
| ***G06F 16/28*** | (2019.01) |
| ***G06F 18/213*** | (2023.01) |
| ***G06F 18/2433*** | (2023.01) |
| ***G06N 3/088*** | (2023.01) |
| ***G06N 7/01*** | (2023.01) |
| ***G06N 20/00*** | (2019.01) |

(52) U.S. Cl.

CPC .......... *G06F 16/285* (2019.01); *G06F 16/287* (2019.01); *G06F 18/213* (2023.01); *G06F 18/2433* (2023.01); *G06N 3/088* (2013.01); *G06N 7/01* (2023.01); *G06N 20/00* (2019.01)

(58) Field of Classification Search

CPC ........ G06N 20/00; G06N 3/088; G06N 7/005; G06F 16/287; G06K 9/6232; G06K 9/6284

See application file for complete search history.

(56) References Cited

U.S. PATENT DOCUMENTS

| | | | | |
|---|---|---|---|---|
| 9,122,956 | B1 | 9/2015 | Fink | |
| 10,045,218 | B1 | 8/2018 | Stapleton et al. | |
| 10,789,530 | B2 * | 9/2020 | Bruss | G06F 16/254 |
| 11,169,514 | B2 * | 11/2021 | Song | G06N 3/08 |
| 2007/0220595 | A1 * | 9/2007 | M'raihi | H04L 63/1416 726/5 |
| 2016/0219067 | A1 * | 7/2016 | Han | H04L 63/1425 |
| 2018/0218256 | A1 | 8/2018 | Raviv et al. | |

OTHER PUBLICATIONS

Edmunds et al., "Deep semi-supervised embeddings for dynamic targeted anomaly detection." (Year: 2017).*

(Continued)

*Primary Examiner* — Adam C Standke

(74) *Attorney, Agent, or Firm* — ALSTON & BIRD LLP

(57) ABSTRACT

Various embodiments provide systems and methods for detecting data abnormalities within data sets relating to a particular agent and comprising both discrete and continuous data features by encoding the one or more discrete features and generating a sequential feature vector representative of both the encoded discrete features and the continuous features, reducing the dimensionality of the generated sequential feature vector to generate a reduced dimension behavioral vector, and comparing the reduced dimension behavioral vector against other reduced dimension behavioral vectors.

22 Claims, 10 Drawing Sheets

(56) References Cited

OTHER PUBLICATIONS

Anowar et al., "Auction fraud classification based on clustering and sampling techniques." 2018 17th IEEE International Conference on Machine Learning and Applications (ICMLA). IEEE, (Year: 2018).*

Wang, Haibo, et al. "Deep structure learning for fraud detection." 2018 IEEE international conference on data mining (ICDM). IEEE, (Year: 2018).*

Chen, Zhiyuan, et al. "Exploration of the effectiveness of expectation maximization algorithm for suspicious transaction detection in anti-money laundering." 2014 IEEE Conference on Open Systems (ICOS). IEEE, (Year: 2014).*

Jurgovsky et al. "Sequence classification for credit-card fraud detection." Expert Systems with Applications 100 (Year: 2018).*

Guo et al. "Multidimensional time series anomaly detection: A gru-based gaussian mixture variational autoencoder approach." Asian Conference on Machine Learning. PMLR (Year: 2018).*

Chen et al. "Vista: Validating and refining clusters via visualization." Information Visualization 3.4 (Year: 2004).*

Edmunds et al., "Deep semi-supervised embeddings for dynamic targeted anomaly detection." (Year: 2007).*

Sabau, Survey of Clustering Based Financial Fraud Detection Research, Faculty of Mathematics and Computer Science University of Pitesti, Informatica Economica, vol. 16, Jan. 2012, pp. 110-122, [online], [retrieved Apr. 24, 2019], [retrieved Apr. 24, 2019], retrieved from the Internet <URL: https://www.researchgate.net/publication/267686837_Survey_of_Clustering_based_Financial_Fraud_Detection_Research>.

Qiao et al., Abnormal Event Detection Based on Deep Autoencoder Fusing Optical Flow, Proceedings of the 36th Chinese Control Conference, Jul. 26-28, 2017, pp. 11098-11103, [online], [retrieved Apr. 24, 2019], [retrieved Jul. 24, 2019], retrieved from the Internet <URL: https://ieeexplore.ieee.org/document/8029129>.

Li et al., Transaction Fraud Detection Using Gru-Centered Sandwich-Structured Model, Proceedings of the 2018 IEEE 22nd International Conference on Computer Supported Cooperative Work in Design, May 9-11, 2018, pp. 467-472, [online], [retrieved Apr. 24, 2019], [retrieved Apr. 24, 2019], retrieved from the Internet <URL: https://ieeexplore.ieee.org/document/8465147>.

Li et al., A Hybrid Malicious Code Detection Method Based on Deep Learning, International Journal of Software Engineering and Its Applications, vol. 9, No. 5, (2015), pp. 205-216, [online], [retrieved Apr. 24, 2019], [retrieved Apr. 24, 2019], retrieved from the Internet <URL: https://www.semanticscholar.org/paper/A-Hybrid-Malicious-Code-Detection-Method-based-on-Li-Ma/45baf042f5184d856b04040f14dd8e04aa7c11f6>.

Carvalho et al., Deep Learning for Fraud Detection, Mar. 22, 2018, pp. 1-7, [online], [retrieved Apr. 24, 2019], [retrieved Apr. 24, 2019], retrieved from the Internet <URL: https://engineering.sift.com/deep-learning-fraud-detection/>.

* cited by examiner

SYSTEMS AND METHODS FOR TIME-BASED ABNORMALITY IDENTIFICATION WITHIN UNIFORM DATASET

BACKGROUND

As big-data storage and processing systems become increasingly more complex, a need constantly exists for systems and methods capable of identifying individual data records, related and sequential series of data records, and/or individual clusters of data records exhibiting abnormal data characteristics within a large dataset. Such needs may be particularly acute in fraud detection scenarios, as potential fraudsters may constantly adjust their fraudulent behavior in an attempt to maximize their own personal gain while avoiding detection by existing fraud detection systems and methods.

Through applied effort and ingenuity, various embodiments satisfy the above-mentioned needs as discussed in greater detail herein.

BRIEF SUMMARY

Certain embodiments are configured for detecting sequential data records collectively exhibiting abnormal data characteristics within a large data set via vectorization processes for combining multiple data types (e.g., discrete data and continuous data) from a related series of data records into a single vector through one or more feature extraction and vectorization methodologies, and dimensionally reducing the generated vector (e.g., via one or more hashing, encoding, and/or other dimensionality reduction strategies) for comparisons with other data through clustering, machine-learning based comparisons, and/or other comparison methodologies to identify one or more abnormal series of data records.

Certain embodiments are directed to a method for detecting data abnormalities within agent-specific datasets. In various embodiments, the method comprises: receiving a plurality of agent-specific data sets, wherein each of the plurality of agent-specific data sets comprises (a) one or more continuous features for a given agent and (b) one or more discrete features for the given agent; encoding the one or more discrete features for the given agent into one or more discrete feature vectors for the given agent; constructing one or more sequential feature vectors for the given agent based at least in part on the one or more discrete feature vectors and one or more continuous feature vectors corresponding to the one or more continuous features; reducing dimensionality of one or more sequential feature vectors into one or more behavior vectors each corresponding to one of the one or more agents; identifying, based at least in part on a plurality of behavior vectors each corresponding to one of the plurality of agents, abnormal data characteristics within one or more behavior vectors; constructing an interface that displays a visual representation of one or more of the plurality of behavior vectors each corresponding to an agent; and transmitting the interface to a user device.

In certain embodiments, organization of one or more behavior vectors is determined using a supervised learning algorithm. Moreover, organization of one or more behavior vectors may be determined using an unsupervised learning algorithm. In various embodiments, one or more agents are grouped into a subset of the one or more agents based on a filter system. In various embodiments, the filter system groups one or more agents by industry type.

In various embodiments, encoding the one or more discrete features for the given agent comprises encoding the one or more discrete features via at least one of: fixed embeddings lookup, embeddings initialization and evolution during model training, target encoding, one-hot-encoding, or feature hashing.

In certain embodiments, reducing dimensionality of the one or more sequential feature vectors comprises reducing the dimensionality of the one or more sequential feature vectors via a sequence encoder and an auto-encoder.

Various embodiments are directed to a system for detecting data abnormalities within agent specific datasets. In various embodiments, the system comprises: one or more memory storage areas; and one or more processing entities configured to: receive a plurality of agent-specific data sets, wherein each of the plurality of agent-specific data sets comprises (a) one or more continuous features for a given agent and (b) one or more discrete features for the given agent; encode the one or more discrete features for the given agent into one or more discrete feature vectors for the given agent; construct one or more sequential feature vectors for the given agent based at least in part on the one or more discrete feature vectors and one or more continuous feature vectors corresponding to the one or more continuous features; reduce dimensionality of one or more sequential feature vectors into one or more behavior vectors each corresponding to one of the one or more agents; identify, based at least in part on a plurality of behavior vectors each corresponding to one of the plurality of agents, abnormal data characteristics within one or more behavior vectors; construct an interface that displays a visual representation of one or more of the plurality of behavior vectors each corresponding to an agent; and transmit the interface to a user device.

In various embodiments, organization of one or more behavior vectors is determined using a supervised learning algorithm. In certain embodiments, organization of one or more behavior vectors is determined using an unsupervised learning algorithm.

In various embodiments, one or more agents are grouped into a subset of the one or more agents based on a filter system.

According to certain embodiments, the filter system groups one or more agents by industry type.

In certain embodiments, encoding the one or more discrete features for the given agent comprises encoding the one or more discrete features via at least one of: fixed embeddings lookup, embeddings initialization and evolution during model training, target encoding, one-hot-encoding, or feature hashing.

In various embodiments, reducing dimensionality of the one or more sequential feature vectors comprises reducing the dimensionality of the one or more sequential feature vectors via a sequence encoder and an auto-encoder.

Certain embodiments are directed to a computer program product comprising a non-transitory computer readable medium having computer program instructions stored therein, the computer program instructions when executed by a processor, cause the processor to: receive a plurality of agent-specific data sets, wherein each of the plurality of agent-specific data sets comprises (a) one or more continuous features for a given agent and (b) one or more discrete features for the given agent; encode the one or more discrete features for the given agent into one or more discrete feature vectors for the given agent; construct one or more sequential feature vectors for the given agent based at least in part on the one or more discrete feature vectors and one or more continuous feature vectors corresponding to the one or more continuous features; reduce dimensionality of one or more sequential feature vectors into one or more behavior vectors each corresponding to one of the one or more agents; identify, based at least in part on a plurality of behavior vectors each corresponding to one of the plurality of agents, abnormal data characteristics within one or more behavior vectors; construct an interface that displays a visual representation of one or more of the plurality of behavior vectors each corresponding to an agent; and transmit the interface to a user device.

In certain embodiments, organization of one or more behavior vectors is determined using a supervised learning algorithm. In various embodiments, organization of one or more behavior vectors is determined using an unsupervised learning algorithm.

In certain embodiments, one or more agents are grouped into a subset of the one or more agents based on a filter system. According to various embodiments, the filter system groups one or more agents by industry type.

In various embodiments, encoding the one or more discrete features for the given agent comprises encoding the one or more discrete features via at least one of: fixed embeddings lookup, embeddings initialization and evolution during model training, target encoding, one-hot-encoding, or feature hashing. In certain embodiments, reducing dimensionality of the one or more sequential feature vectors comprises reducing the dimensionality of the one or more sequential feature vectors via a sequence encoder and an auto-encoder.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
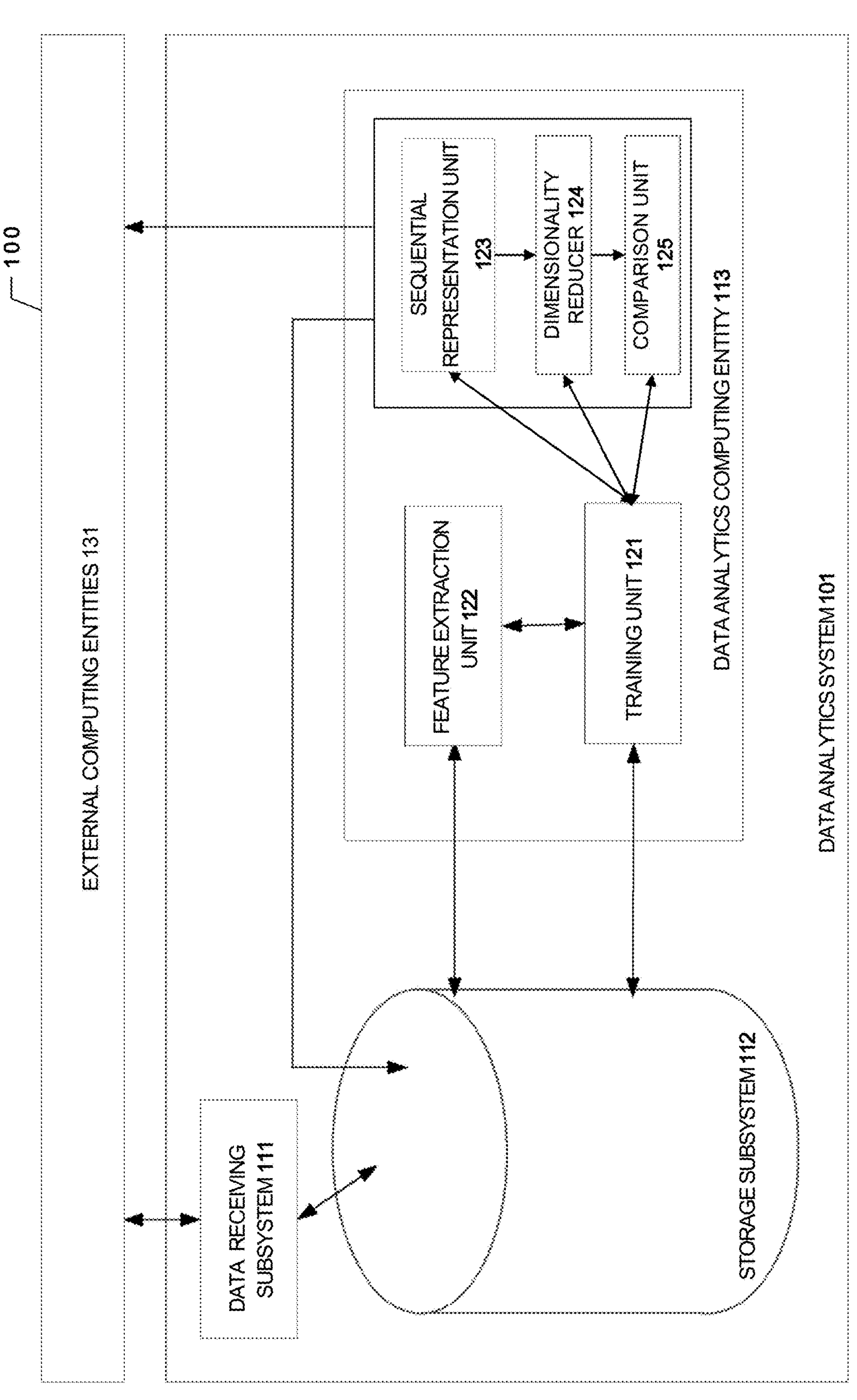
FIG. 1 is an overview of an example architecture that may be used to practice various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. OVERVIEW

Discussed herein are methods, systems, apparatuses, computing devices, computing entities, computer program products, and/or the like for identifying abnormal data records or series of related abnormal data records containing both discrete and continuous data via automated processes. Such abnormalities may be identified as individual data records having abnormal characteristics relative to a larger data set (e.g., billing data records having drastically higher billing amounts) or a series of related data records collectively indicative of abnormal long-term characteristics (e.g., an abnormally predictable cadence at which particular bill amounts are submitted).

Input data (e.g., data relating to a particular agent, such as a particular healthcare provider in one embodiment) containing both discrete and continuous features is vectorized through processes for extracting the continuous features and the discrete features, vectorizing the discrete features, and generating a sequential representation of the continuous and discrete features. The dimensionality of the sequential representation of the input data is then reduced via methodologies providing an accurate representation of the input data (e.g., via reversible data encoding methodologies that may be checked for representational accuracy via reversal methodologies). The resulting reduced dimension representations of the input data may be compared with other data (e.g., input data relating to other agents, such as other healthcare providers in certain embodiments) via clustering techniques, via machine-learning based comparison or classification techniques, and/or the like, to identify outlier data that may be indicative of abnormal data characteristics (e.g., which may be representative of potentially fraudulent agent behavior).

A. Technical Problems

Existing abnormality detection systems and methods are generally incapable of detecting abnormal data characteristics manifest over a long-period of time through interactions between discrete and continuous data types. Instead, existing abnormality detection systems and methods rely on the assumption a single snapshot of data (e.g., representing a very small individual period of time) is representative of the overall, long-term characteristics of data. In fraud detection contexts, this assumption effectively means that a fraud detection system must assume that a potential fraudster's behavior is constant over time. Thus, in fraud detection contexts, these abnormality detection systems and methods may be incapable of detecting small-scale fraudulent data generated at regular intervals over a long period of time, in which each individual data record may be similar to non-fraudulent data records, but the long-term pattern of abnormal data generation is indicative of fraudulent behavior.

The difficulty of identifying abnormal data records over a long period of time may be further complicated by the inclusion of both discrete and continuous data within each data record. Existing systems are generally incapable of effectively considering both discrete and continuous data simultaneously during abnormality detection processes, and therefore data abnormalities relating to the interaction between discrete and continuous data types may go undetected by existing configurations.

B. Technical Solutions

Various embodiments provide abnormality detection systems and methods capable of performing long-term or time-dependent analyses of data sets to identify abnormal (or fraudulent) data characteristics manifest through unusual patterns of data generation over time. Various embodiments utilize vectorization processes combined with dimensionality reduction processes to implement such abnormality detection systems and methods, thereby providing data handling procedures capable of reviewing large series of data records that may otherwise be characterized by extremely large file sizes and otherwise unacceptable levels of processing latency.

For example, various embodiments incorporate a machine learning model architecture configured to capture sequential submission behavior for a particular data source (e.g., a single agent, such as a single healthcare provider in the healthcare fraud detection context) and represent the data source's entire history as a condensed representation. This solution thereby avoids the assumption that the single aggregated representation of a data source's behavior is fully representative of the data source's long-term behavior by capturing the temporal variation in behavior for a given data source. The resulting data generated for a particular data source may then be compared using various comparison methodologies to determine which data sources are exhibiting potentially abnormal or fraudulent behaviors.

Moreover, various embodiments are capable of addressing interactions between discrete data features and continuous data features through specific data extraction and vectorization processes to incorporate potentially abnormal interactions. Specifically, the dimensionally reduced data utilized for identifying abnormal data characteristics includes representations of both discrete features and continuous features included within generated data, through one or more feature vectorization processes utilized for generating a fully-inclusive sequential representation of the generated data. That sequential representation may then be dimensionally reduced, such that comparisons with other data to identify abnormal data characteristics are based in part on interactions between the included continuous data features and discrete data features of the original data.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

The architecture 100 includes a data analytics system 101 that interacts with one or more external computing entities 131 (e.g., via a computer network). The external computing entities 131 can provide data to the data analytics system 101 and receive predictions from the data analytics system 101. Each computing entity and/or computing system in the architecture 100 may include any suitable network server and/or other type of processing device. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.).

The architecture 100 may be used to perform various data analytics tasks, such as predicting health conditions (e.g., probability of a particular patient having a particular disease) and/or predicting financial conditions (e.g., probability of a particular transaction being fraudulent). In one example, the data analytics system 101 could be a medical record storage and processing platform. The external computing entities 131 may include computing entities associated with hospitals, doctors' offices, insurance companies, etc. that seek to supply data to and/or retrieve data from a medical record storage and processing platform. In another example, the data analytics platform 101 could be a financial data storage and processing platform. The external computing entities may include computing entities 131 associated with vendor and/or service provider entities that supply data to and/or retrieve data from a medical record storage and processing system.

The data analytics system 101 includes a data receiving subsystem 111 (and/or data generating subsystem), a storage subsystem 112, and a data analytics computing entity 113. The data receiving subsystem 111 is configured to generate data to store in the storage subsystem 112. The data analytics computing entity 113 is configured to analyze data stored in the storage subsystem 112 to generate one or more predictions.

The data received and/or generated by the data receiving subsystem 111 and stored in the storage subsystem 112 may include at least one of: (i) one or more data entries each comprising original feature entries (including both discrete and continuous feature entries) used by the data analytics computing entity 113 to perform comparisons; (ii) one or more groups of training data entries used by a training unit 112 of the data analytics computing entity 113 to train at least one of a feature extraction unit 122 of the data analytics computing entity 113, a dimensionality reducer 124 of the data analytics computing entity 113, a comparison unit of the data analytics computing entity 113, and/or the like; (iii) data used to configure one or more parameters of at least one component of the data analytics system 101; (iv) data related to past performance and/or activity of at least one component of the data analytics system 101; and (v) previously generated sequential data representations, previously generated reduced dimension representations of data, previously generated comparison data, and/or the like.

The data receiving subsystem 111 may receive and/or generate data based on information received from the external computing entities 113. For example, the data receiving subsystem 111 may receive and/or generate original feature data entries containing discrete and continuous data based on health record data provided by one or more external computing entities 131 associated with one or more hospitals or other agents. As another example, the data receiving subsystem 111 may receive and/or generate training data entries based on medical record data obtained from one or more external computing entities 131 associated with one or more agents, such as one or more medical provider institutions.

The data receiving subsystem 111 may generate data using information provided by one or more components of the data analytics computing entity 113. For example, the data receiving subsystem 111 can generate training prediction values based on past feature extractions by the feature extraction unit 122.

Each group of original feature entries (e.g., a single data record, a series of related data records, and/or the like) generated and/or received by the data receiving subsystem 111 may be characterized by a set of original features including both discrete and continuous features, such that each original feature entry in the respective group of original feature entries includes a defined or undefined original feature value for each original feature in the set of original features characterizing the respective group of original feature entries.

In various embodiments the original feature entries generated and/or received by the data receiving subsystem 111 may be a part of a time-series of a plurality of feature entries reflecting the behavior of a particular agent over time. For example, individual data records each comprising a plurality of individual feature entries may be generated and provided to the data analytics system 101 at discrete times over an extended period of time. Collectively, the series of data records represent the overall historical behavior of the agent, reflecting any time-based changes in the agent's behavior. These data records may be related to one another based on common agent identifiers included with each data record, such that the data analytics system 101 may perform time-series based analyses of the plurality of data records.

The storage subsystem 112 may store data as one or more databases, e.g., one or more relational databases. Examples of data stored by the storage subsystem 112 include medical record data, medical payment request data, insurance transaction data, bank transaction data, etc.

The storage subsystem 112 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In various embodiments, the storage subsystem 112 is configured to store received and/or generated data for one or more agents, metadata information about operation of the data analytics computing entity 113, and/or the like. In various embodiments, the storage subsystem 112 is configured to store a database, such as a relational database. In various embodiments, the storage subsystem 112 is configured to store a file having a preconfigured format, such as JSON format.

The data analytics computing entity 113 is configured to analyze data records as a part of a series of a plurality of data records to identify outlier, abnormal, and/or potentially fraudulent data characteristics relative to a larger data set representative of a plurality of agents. For example, the data analytics computing entity 113 may analyze original feature entries related to medical claims submitted by a particular agent over time to identify abnormal claim submission characteristics. The data analytics computing entity 113 can store the results of its analysis in the storage subsystem 112 and/or provide its results as outputs to one or more external computing entities 131.

The data analytics computing entity 113 includes a training unit 121, a feature extraction unit 122, a sequential representation unit 123, a dimensionality reducer 124, and a comparison unit 125. The training unit 121 is configured to train the feature extraction unit 122 and/or other components 123-125 by determining values of trainable parameters used by one or more of the components. The training unit 121 may determine training data entries based on data that the training unit 121 retrieves from the storage subsystem 112 and/or from data that the training unit receives from at least one external computing entity 131.

The feature extraction unit 122 is configured to process original feature entries within received data records that the feature extraction unit 122 retrieves from the storage subsystem 112 in accordance with the trainable parameters of the feature extraction unit 122 to determine one or more processed feature entries from the data records. The feature extraction unit 122 may be configured to extract and distinguish between continuous and discrete data entries within a data record, such that specific data processing methodologies may be performed on the extracted features based on their specific data type. In certain embodiments, the feature extraction unit 122 may be configured to vectorize specific data features to ease further processing. For example, the feature extraction unit 122 may be configured to vectorize discrete features to create a corresponding processed feature entry using any one of the following processes, fixed embeddings lookup, embeddings initialization and evolution during model training, target encoding, one-hot-encoding, feature hashing, and/or the like.

As discussed herein, the sequential representation unit 123 may be configured to generate a sequential representation of a particular data record (or a series of a plurality of data records relating to a single agent), including data representing values of both discrete and continuous data entries. The sequential representation may be a vector including sequential data entries that, as a whole, the vector is representative of the content of the data record or series of data records (including both discrete and continuous data entries).

The dimensionality reducer 124 is configured to apply one or more dimensionality reduction techniques to the generated sequential representation to generate a representative, reduced-dimension vector highlighting attributes of the sequential representation for a particular agent. In certain embodiments, the dimensionality reducer 124 may be further configured to dimensionally expand the reduced-dimension vector to determine the accuracy of the dimensionality reduction process. As discussed herein, the dimensionality reducer 124 may rely on the training unit 121 to constantly adjust the dimensionality reduction techniques to more accurately reflect the contents of a sequential representation.

Finally, the data analytics computing entity 113 comprises a comparison unit 125 configured to compare a plurality of reduced-dimension vectors each relating to a particular agent to identify abnormal data characteristics. The comparison unit 125 may be configured to utilize any of a variety of comparison techniques, such as clustering techniques, simple comparison techniques utilizing a training data set to identify abnormal behavior, supervised and/or unsupervised machine learning techniques for automatically identifying abnormal data characteristics, and/or the like. The comparison unit 125 may be further configured for generating one or more outputs that may be provided to an external computing entity 131 (e.g., a graphical interface reflective of the results of the comparison process).

A. Exemplary Data Analytics Computing Entity

Figure 2:
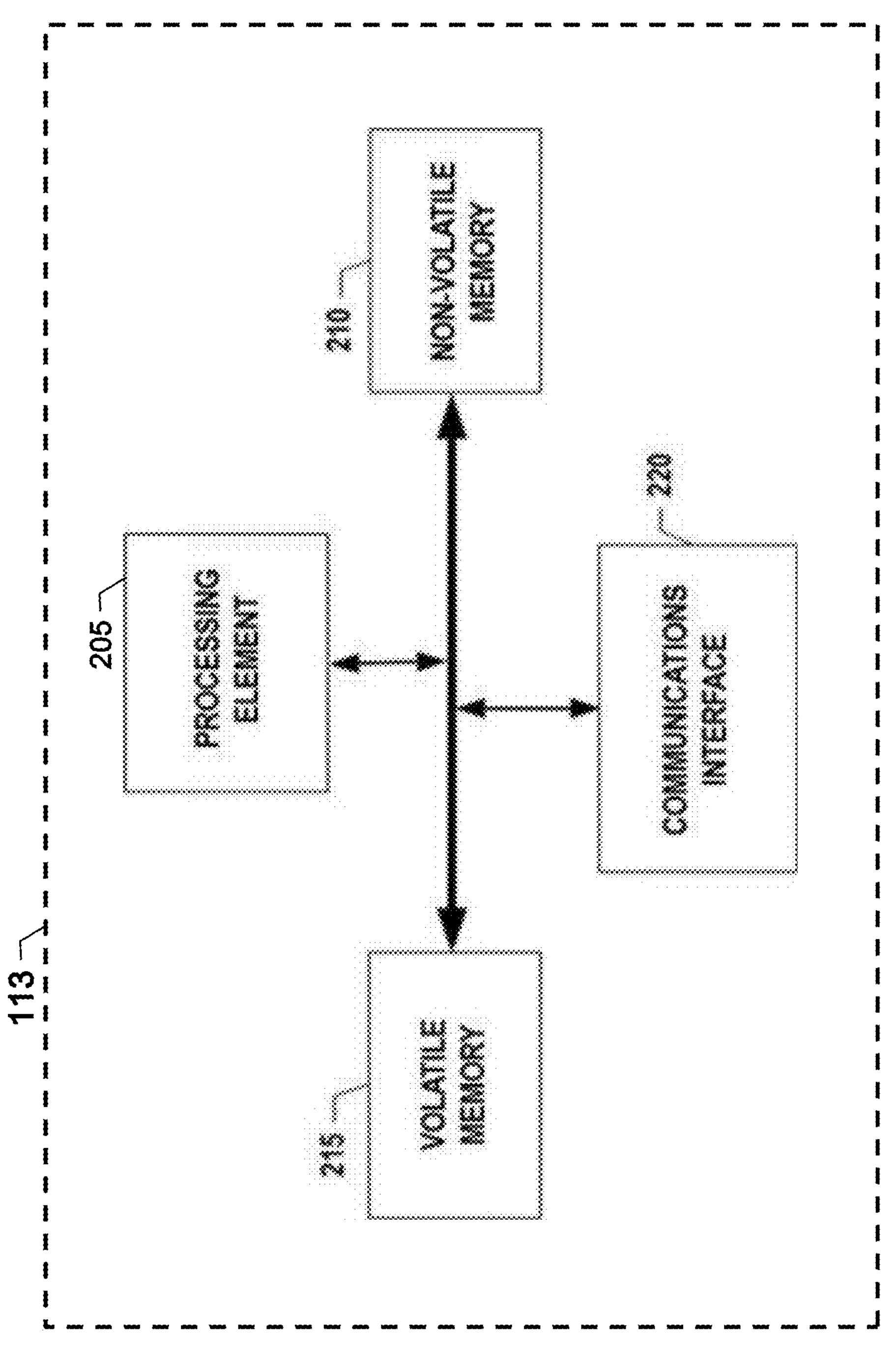
FIG. 2 illustrates an example data analytics computing entity in accordance with some embodiments discussed herein.

FIG. 2 provides a schematic of a data analytics computing entity 113 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data analytics computing entity 113 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analytics computing entity 113 may include or be in communication with one or more processing elements 205 (also referred to as processors, processing circuitry, and/or similar terms used herein interchangeably) that communicate with other elements within the data analytics computing entity 113 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analytics computing entity 113 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data analytics computing entity 113 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analytics computing entity 113 with the assistance of the processing element 205 and operating system.

As indicated, in one embodiment, the data analytics computing entity 113 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analytics computing entity 113 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the data analytics computing entity 113 may include or be in communication with one or more input elements, such as a keyboard input, a mouse input, a touch screen/display input, motion input, movement input, audio input, pointing device input, joystick input, keypad input, and/or the like. The data analytics computing entity 113 may also include or be in communication with one or more output elements (not shown), such as audio output, video output, screen/display output, motion output, movement output, and/or the like.

As will be appreciated, one or more of the management computing entity's 100 components may be located remotely from other data analytics computing entity 113 components, such as in a distributed system. Furthermore, one or more of the components may be combined and additional components performing functions described herein may be included in the data analytics computing entity 113. Thus, the data analytics computing entity 113 can be adapted to accommodate a variety of needs and circumstances. As will be recognized, these architectures and descriptions are provided for exemplary purposes only and are not limiting to the various embodiments.

B. Exemplary External Computing Entity

Figure 3:
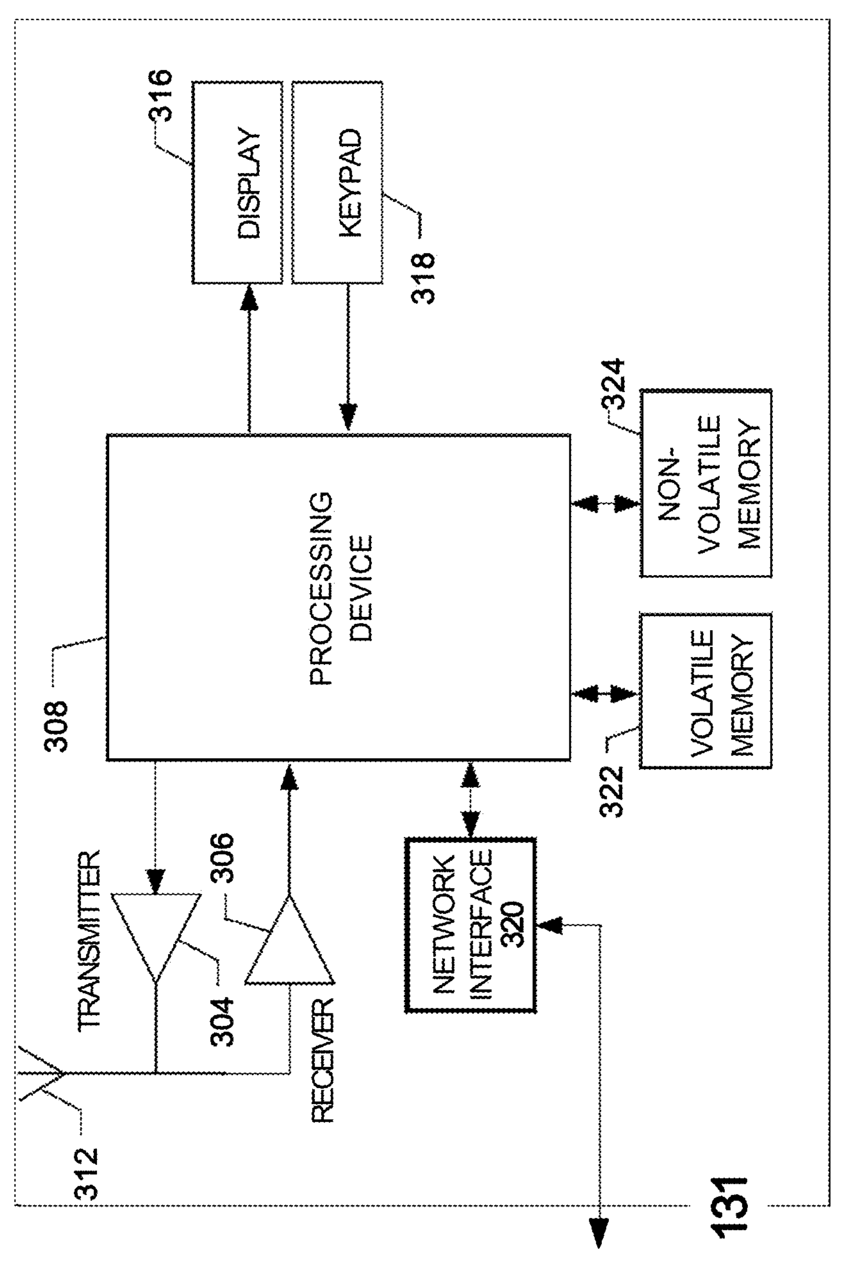
FIG. 3 illustrates an example external computing entity in accordance with some embodiments discussed herein.

An external entity may be an individual, a family, a company, an organization, an entity, a department within an organization, a representative of an organization and/or person, and/or the like. An external entity may operate an external computing entity 131 that includes one or more components that are functionally similar to those of the data analytics computing entity 113. FIG. 3 provides an illustrative schematic representative of an external computing entity 131 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the external computing entity 131 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the external computing entity 131 may be capable of operating with one or more air interface standards, communication protocols, modulation types, and access types. More particularly, the external computing entity 131 may operate in accordance with any of a number of wireless communication standards and protocols, such as those described above with regard to the data analytics computing entity 113. In a particular embodiment, the external computing entity 131 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 131 may operate in accordance with multiple wired communication standards and protocols, such as those described above with regard to the data analytics computing entity 113 via a network interface 320.

Via these communication standards and protocols, the external computing entity 131 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 131 can also download changes, add-ons, and updates, for instance, to its firmware, software (e.g., including executable instructions, applications, program modules), and operating system.

According to one embodiment, the external computing entity 131 may include location determining aspects, devices, modules, functionalities, and/or similar words used herein interchangeably. For example, the external computing entity 131 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 121 position in connection with a variety of other systems, including cellular towers, Wi-Fi access points, and/or the like. Similarly, the external computing entity 131 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 131 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 131 to interact with and/or cause display of information from the data analytics computing entity 113, as described herein. The user input interface can comprise any of a number of devices or interfaces allowing the external computing entity 131 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 131 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 131 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 131. As indicated, this may include a user application that is resident on the entity or accessible through a browser or other user interface for communicating with the data analytics computing entity 113 and/or various other computing entities.

In another embodiment, the external computing entity 131 may include one or more components or functionality that are the same or similar to those of the data analytics computing entity 113, as described in greater detail above. As will be recognized, these architectures and descriptions are provided for exemplary purposes only and are not limiting to the various embodiments.

In various embodiments, an external computing entity 131 may be embodied as an artificial intelligence (AI) computing entity, such as an Amazon Echo, Amazon Echo Dot, Amazon Show, Google Home, and/or the like. Accordingly, the external computing entity 131 may be configured to provide and/or receive information/data from a user via an input/output mechanism, such as a display, a camera, a speaker, a voice-activated input, and/or the like.

In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event. For example, the AI computing entity may be configured to retrieve and/or execute a particular program (e.g., the described cognitive evaluation game) in response to an audible, vocal request from a user (e.g., a user speaking an instruction to the AI computing entity to execute the particular program).

IV. EXEMPLARY SYSTEM OPERATION

The operation of various embodiments are described herein with specific reference to FIGS. 4-10. As discussed herein, various embodiments are directed to systems and methods for abnormality detection in large datasets comprising data record series for each of a plurality of agents (or other data sources). Beginning with a disclosure relating to FIG. 4, which provides a high level illustration of various configurations executed according to certain embodiments, the following description provides an indication of configurations according to various embodiments. Such configurations encompass an end-to-end model architecture 400 that enables the consumption and analysis of sequential data (e.g., a plurality of discrete data records) for an agent of a plurality of agents to identify agents exhibiting abnormal (e.g., potentially fraudulent) behavior.

Figure 4:
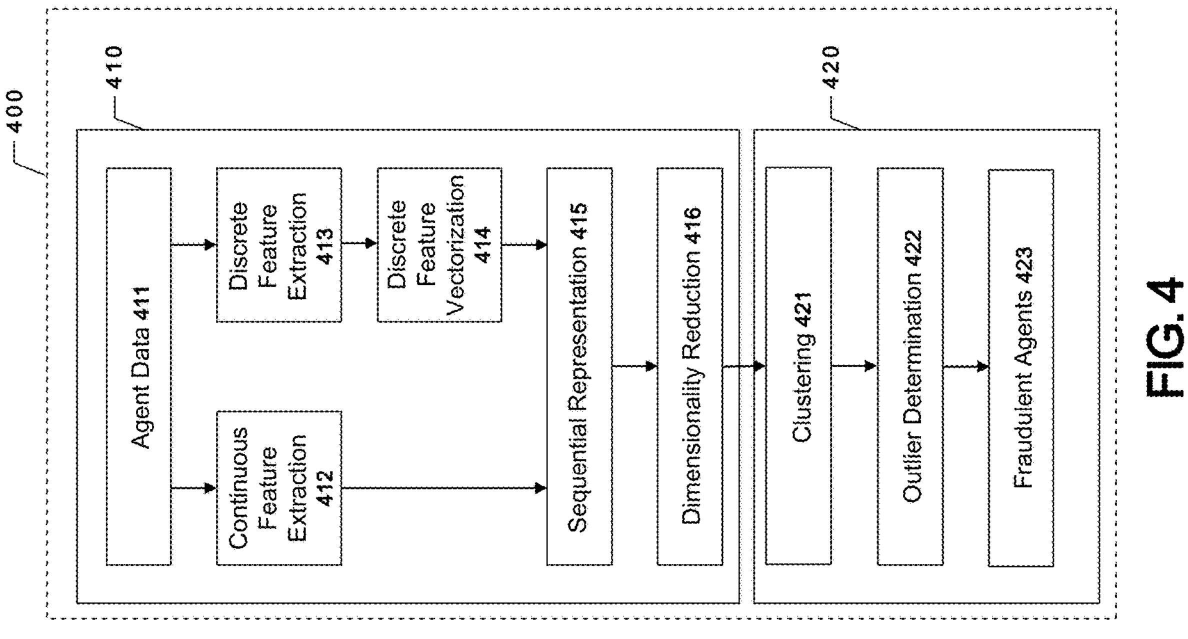
FIG. 4 illustrates an example data flow according to various embodiments discussed herein.

As illustrated in FIG. 4, various configurations are performed based on agent data 411, which may be received at the data analytics system 101. Moreover, the model architecture 400 illustrated in FIG. 4 comprises agent-specific components 410 (e.g., performed for single agents) and group-specific components 420 (e.g., performed for a plurality of agents).

As illustrated in FIG. 4, the agent-specific components 410 comprise an agent data module 411 configured to pass data (e.g., data records) from the storage subsystem 112 to the model, wherein the data is original and comprises both continuous and discrete feature values. The continuous features are extracted in the continuous feature extraction module 412 and the discrete features are extracted in the discrete feature extraction module 413. The discrete features are then vectorized in the discrete feature vectorization module 414. The processed continuous and discrete features are converted into a collective sequential representation using the sequential representation module 415. The processed sequential representation is then fed into the dimensionality reduction module 416 which may utilize a recurrent neural network to reduce the dimensions of the sequential representation and the output is a behavior vector for a given agent.

The group-specific components 420 is configured to determine a behavior vector for each agent in the set of N agents and then the clustering module 421 (or other comparison module) is configured to arrange agents based on similarities between behavior vectors. The outlier determination module 422 is configured to determine the agents that are displaying irregular behavior. The first step of outlier determination is performed via one of a plurality of methodologies, which may be selected from: (a) deducing that the points a given distance from the cluster's center are considered outliers and/or (b) observing small-sized clusters of non-standard behavior. In certain embodiments, predicting whether a particular agent exhibits abnormal behavior may comprise performing outlier detection within each cluster. Outlier detection may be performed at least in part based on probabilistic methods (probability of an agent being non-fraudulent based on density estimates, for example from an expectation-maximization-trained model), isolation forests, DBSCAN outliers, Interquartile range, and/or the like, as discussed in greater detail herein. The fraudulent agents module 423 is configured to transmit the observed fraudulent agents information to the external computing entities 131.

The agent data may comprise one or more data records each comprising data relating to one or more events. In the healthcare related context, each agent data record may relate to a single reimbursement request from a healthcare provider relating to a particular patient interaction, although other configurations may be usable in certain embodiments.

Each record of the agent data 411 may comprise data identifying a particular agent to which the data record relates. Such identifying data may comprise a unique identifier (e.g., an alphanumeric string), an agent name, an agent address (or other location data), an agent contact information (e.g., a phone number, email address, and/or the like), and/or the like. Each record of the agent data 411 may additionally comprise further identifying data relating to the agent that may be utilized to categorize the agent relative to various peers. For example, the agent data 411 may be indicative of an agent specialty (e.g., a healthcare provider specialty), an agent location/region, and/or the like. Although discussed herein as being included within individual agent data records, it should be understood that one or more portions of the agent identifying data may be stored at the data analytics system 101 (e.g., within the storage subsystem 112) as a portion of an agent profile. In such embodiments, each agent data record may comprise at least a portion of the agent identifying data, and the data analytics system 101 may be configured to retrieve additional relevant agent identifying data from an applicable agent profile by querying the storage subsystem 112 utilizing the agent identifying data within the data record.

Each agent data record may additionally comprise data specific to the particular patient interaction, reimbursement request, and/or the like. For example, such data may comprise data including an interaction type, an interaction length, one or more billing codes associated with the data record, one or more diagnostic codes associated with the data record, one or more procedure codes associated with the data record, a billing cost amount associated with the data record, a date and/or time associated with the data record, one or more patient measurements and/or sensor measurements recorded during the interaction, and/or the like. Such data may be distinguished between discrete features (features having a plurality of discrete options for selection, which may not be conducive to inclusion along a scale, for example diagnostic codes assigned to a particular interaction) and continuous features (features having values selectable from a continuous scale of values, such as monetary-related values, sensor readings (e.g., a temperature sensor reading, a weight reading, a height/length reading, and/or the like), and/or the like).

Moreover, each data record of the agent data 411 may be identified as a single record within a series of related records for a particular agent. For each, each data record may relate to a particular interaction between the agent and a patient, and all data records relating to the particular agent may collectively form a time-series collection of data records that may be analyzed by the data analytics system 101 for the particular agent, thereby enabling the data analytics system 101 to identify potentially abnormal behavioral characteristics for the agent based on relationships (e.g., chronological relationships, temporal spacing, and/or the like) between a plurality of the discrete data records for the agent.

In certain embodiments, the series of related records for a particular agent may encompass all (or a select portion) of the data records for the agent generated during a defined time period. The defined time period may encompass the entire practicing history (in other words, the entire career) for a particular agent, or may encompass a defined length of time (e.g., between a defined start date and a defined end date). Furthermore, multiple such time periods may be used per agent over a fixed set of one or more time windows or sliding time windows, such that any window of fraudulent activity identified for a given agent may be indicative of a fraudulent provider on the whole. As discussed herein, each individual data record may be provided from an external computing entity 131 associated with the agent to the data analytics system 101, which may then store each individual data record within the storage subsystem 112 for later reference and use during analysis processes as described herein. Thus, upon initiation of an analysis process for a particular agent, a plurality of data records relating to the particular agent may be retrieved from the storage subsystem 112 for use during the analysis. Moreover, because additional data records may be generated for the agents (e.g., periodically, continuously, at defined times, and/or the like), the analysis may be reperformed for particular agents periodically, upon the occurrence of defined trigger events, and/or the like. Thus, raw data relating to particular data records may remain stored within the storage subsystem 112 for a particular agent even after such data is utilized in an agent analysis, such that the data may be utilized during subsequent iterations of the agent analysis.

Moreover, it should be understood that agent data 411 is a term utilized for example purposes only, and may be reflective of other, non-healthcare related data for which a similar analysis may be performed. For example, in financial services contexts, agent data may relate to specific transactions performed on behalf of a client by a financial services provider. It should be understood that similar configurations may be provided for other contexts as well, regardless of whether a particular individual, community, facility, entity, and/or the like is providing products or services to customers/clients.

A. Feature Extraction

As illustrated in blocks 412 and 413, agent data 411 (e.g., one or more data records for a particular agent) is received at the data analytics system 101 and is processed by one or more portions of an included data analytics computing entity 113. Such processing may begin with feature extraction processes (e.g., performed by a feature extraction unit 122). In certain embodiments, such data records may be sequential in nature, thereby showing temporal variations, trends, and/or the like for a particular agent. Extraction processes may be performed utilizing application program interface (API) configurations in which specific data fields of a data record are mapped to particular extracted data contexts via the feature extraction unit 122, although any of a variety of other feature extraction methodologies may be utilized. For example, metadata corresponding to particular features within the data object may be utilized to identify particular features stored within those data records. In other embodiments, one or more machine learning configurations may be utilized to identify particular data entries and to extract those data entries as individual features to be utilized during later analysis. Such machine learning configurations may rely on supervised or unsupervised machine learning methodologies, utilizing training data (as maintained by the training unit 121 and the storage subsystem 112 as discussed herein) to identify particular features for extraction from the data records.

Moreover, the feature extraction unit 122 may be configured to determine whether a particular feature is a discrete feature or a continuous feature. Again, the feature extraction unit 122 may be configured to utilize machine learning in certain embodiments to classify each feature as either discrete or continuous. In other embodiments, metadata within the data records may indicate whether each particular feature is discrete or continuous. In other embodiments, the feature extraction unit 122 may utilize other methodologies for determining whether a particular feature is continuous or discrete.

As shown at block 414 of FIG. 4, the feature extraction unit 122 may be further configured to vectorize discrete features, thereby making such features compatible with later processes for sequentially representing data for particular agents. As discussed in greater detail herein, various embodiments combine the vectorized representations of discrete features with original values for the continuous feature entries to generate sequential representations of the data.

In certain embodiments, vectorization of a discrete original feature entry includes processing the original feature using any one of the following methods, fixed embeddings lookup, embeddings initialization and evolution during model training, target encoding, one-hot-encoding, feature hashing, etc. to generate a processed feature entry corresponding to the original feature entry.

In certain embodiments, a fixed embeddings lookup comprises using a pre-learned list of embeddings, with one embedding vector per discrete level of a given input feature. An embedding vector uniquely represents a given discrete input feature as a unique meaningful representation, and accordingly the fixed embeddings lookup enables the feature extraction unit 122 to replace a discrete value for a feature with a corresponding continuous value utilizing the fixed embeddings lookup table.

In other embodiments utilizing embeddings initialization and evolution during model training for vectorizing discrete features begins with a random embedding per discrete level of a feature. Over time, machine learning configurations learn more appropriate embedding vectors for each discrete level to maximize the model predictive performance as the model is trained. In certain embodiments, the embedding vectors begin with pre-learned values instead of random values and then further evolve the vectors to maximize the predictive performance as the model is trained.

Target encoding may enable the feature extraction unit 122 to vectorize discrete values by converting the discrete values to numerical data by replacing each categorical feature value in the input data with the mean value of the target variable corresponding that discrete feature value throughout the data. In this way a discrete feature may be represented as a single numeric feature that represents the frequency of that feature translating to a particular target level.

One-hot and/or multi-hot encoding methodologies for vectorizing discrete values utilizes a single column per discrete value in a given feature and utilizes a binary "1" indicator in the column for the given feature value when that feature value is present. A multi-hot-encoding can represent when a feature has multiple discrete values per sample. This representation can also count how many instances of a given feature value are in a particular sample. The example of FIG. 7 utilizes multi-hot encoding.

Feature hashing to vectorize a discrete value applies a hash function to the discrete value of a feature to obtain a repeatable index to be utilized for the feature value. That index then determines which value should be set as high (or "1") in a one-hot or multi-hot encoding type representation.

Various embodiments may utilize a plurality of encoding approaches for vectorizing discrete values within a model.

B. Sequential Representation

As indicated at Block 415 of FIG. 4, the vectorized discrete features and the original continuous features may be combined into a sequential representation related to a particular agent, for example, via a sequential representation unit 123. The sequential representation may be indicative of the sequence in which submissions occur (e.g., when data records are generated) as well as the contents of those individual data records. Thereby enabling the data analysis system 101 to determine whether the sequence in which data records are generated and/or the contents of those individual data records are indicative of abnormal (and potentially fraudulent) behavior. As a specific example, a non-fraudulent agent may submit specific procedure codes with a natural irregular cadence. A fraudulent agent may submit claims with a more regular cadence as they would use an algorithm to determine which claim types to submit next or may not even have any variation in which procedure codes they submit. When looked at a specific point in time for an agent, traditional methods would not consider the actual sequence of procedure codes being submitted for a given agent. Hence, our approach would maintain knowledge of the sequence of procedure codes submitted over time and use this information to group agents by procedure code submission ordering and cadence.

Continuing the above example, deep learning-based methodologies for data analysis may represent the data relating to the fraudulent and non-fraudulent agents within a sequential model architecture. This model architecture takes in sequences of inputs and can produce an output sequence (e.g., in vector form) that encodes the relevant information from the input sequence to an output sequence or prediction. The sequences of submissions for an agent may be mapped to a large vector which represents the agent's behavior. This 'behavior vector' can then be compared with other agent's 'behavior vectors'. Examples of sequential model architecture components include: Recurrent neural networks (RNNs), Gated Recurrent Units (GRUs), Long Short-Term Memory Units (LSTMs), and Convolutional Neural Networks (CNN).

C. Dimensionality Reduction

Those behavior vectors generated via the sequential representation processes discussed herein may then be dimensionally reduced, for example, by a dimensionality reducer 124 as shown in FIG. 1 and at Block 416 of FIG. 4. Such dimensional reduction may eliminate potentially noisy information that is not indicative of whether a particular agent is practicing potentially fraudulent behavior, and may provide a representational vector for a particular agent that is more amendable to comparison with other agents. Dimensionality reduction may be achieved with techniques such as Principal Component Analysis (PCA) or t-Distributed Stochastic Neighbor Embedding (t-SNE) applied to the vector representing the behavior of the agents over time. Any number of dimensionality reduction techniques can be employed to achieve lower dimensional representations of the sequence vectors, including Non-Negative Matrix Factorization, Fisher's Linear Discriminant Analysis, and/or the like.

Figure 5:
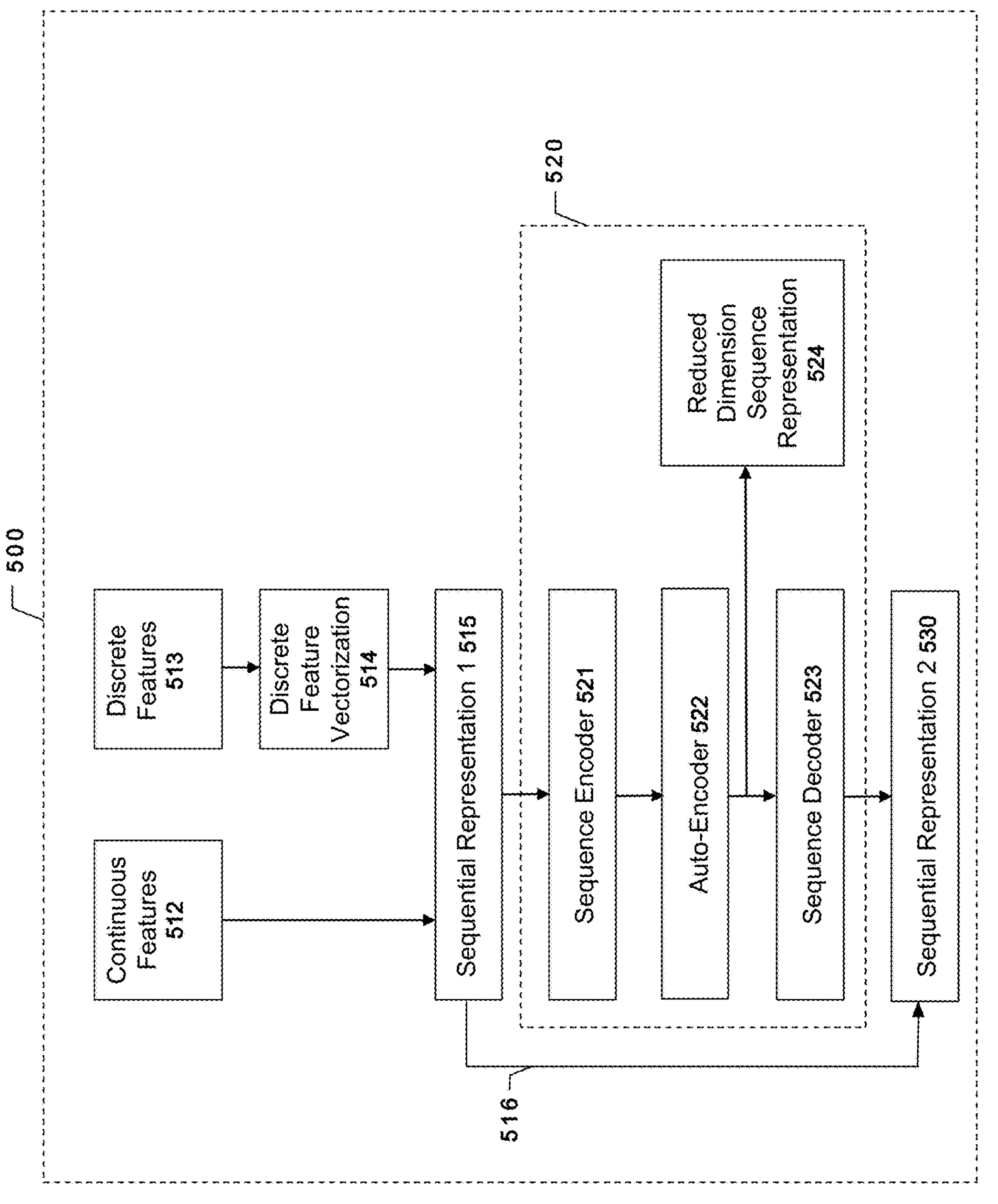
FIG. 5 illustrates additional data flows in accordance with various embodiments discussed herein.

A process for dimensionality reduction via deep learning is provided in further detail within FIG. 5, which illustrates a model architecture 500 of a deep learning model configured for performing dimensionality reduction on sequential data. As reflected in FIG. 5 continuous features 515 and discrete features 513 that have been vectorized 514 are utilized to generate a first sequential representation 515, which is then provided to the dimensionality reducer 124 to reduce the dimensionality of the sequential representation (e.g., behavior vector) for the particular agent.

In the illustrated embodiment of FIG. 5, the deep learning network of the dimensionality reducer 124 comprises a sequence encoder module 521, an auto-encoder module 522 (which may be omitted in certain embodiments) and a sequence decoder module 523 configured to generate a second sequence representation 530 based on the dimensionally reduced vector. The sequence encoder module 521 may be a sequence-to-sequence model that generates an internal behavior vector which contains sufficient information to reconstruct the original sequence (via the sequence decoder 523). Examples of sequence-to-sequence model architectures include recurrent neural networks, recurrent neural networks with gated recurrent units, or recurrent neural networks with long short-term memory units. In other embodiments, a convolutional encoder and a convolutional decoder may be utilized in lieu of a sequence encoder and a sequence encoder configuration (thus having a configuration analogous to that shown in FIG. 5, but utilizing a convolutional encoder and a convolutional decoder). Such an approach uses a convolutional neural network to encode the sequential data to the compressed representation and up-sampling layers to decode the compressed representation to enable network training. The behavior vector produced by the sequence encoder module 521 may then be further reduced in dimension by the auto-encoder module 523 in certain embodiments. The auto-encoder module 523 may be configured to translate the behavior vector through a minimized representation feed forward network (small number of neurons) and to add an output layer designed to train the model weights to reconstruct the original behavior vector from the reduced dimension sequence representation 524. The sequential decoder module 523 is configured to reconstruct the behavior vector/reduced dimension vector 524 from the auto-encoder module 522 using a sequence to sequence model, thereby enabling a comparison between the first sequential representation 515 with the second sequential representation 530 to determine a level of accuracy involved in the dimensionality reduction processes. For example, the second sequential representation 530 may be compared with the first sequential representation 515 by measuring the Euclidian distance, Mean Error or the Mean-Squared Error between the vectors. The smaller the distance, or error, between the vectors indicates the reduced dimension sequence representation 524 is a better representation of the sequential representation 515. In certain embodiments, the dimensionality reducer 124 may utilize an accuracy criteria (e.g., a maximum Euclidian distance between the two vectors or a required mean-squared-error) to determine whether the reduced dimensionality sequence representation 124 is sufficiently accurate for use in comparing the agent against peer agents.

Figure 6:
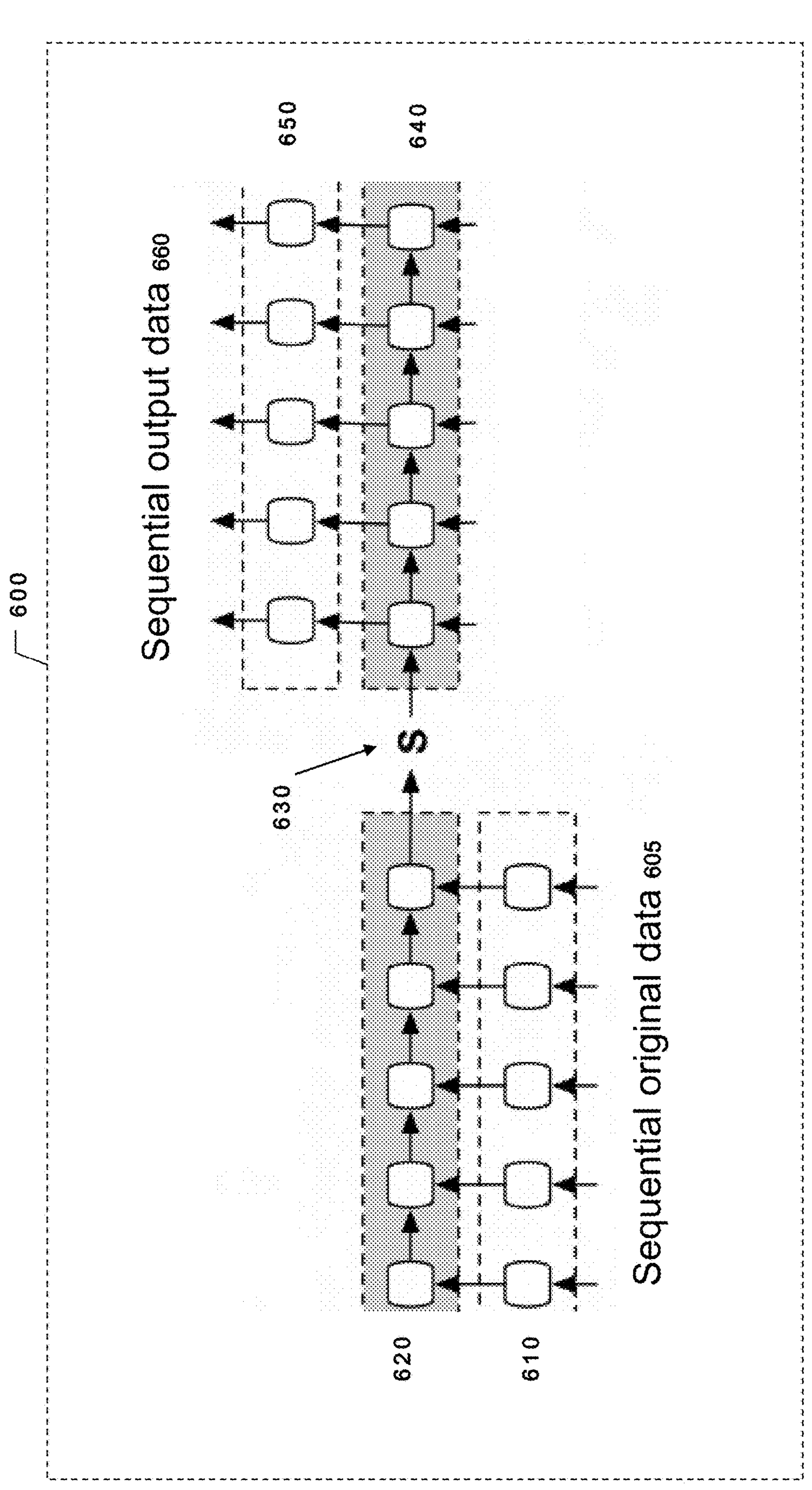
FIG. 6 graphically illustrates encoding processes utilized in accordance with various embodiments as discussed herein.

FIG. 6 provides a graphical representation 600 of the process involved in sequentially encoding and decoding a sequential representation. As shown therein, sequential original data 605 is fed into the continuous and discrete feature vectorization layer 610. The output of the continuous and discrete feature vectorization module is fed into the encoder module 620. The encoder module is configured to reduce the dimensions of the data from the embedding module to produce a hidden state S—the reduced dimension sequence representation (behavior vector) 630. The reduced representation 630 is fed into the decoder module configured to reconstruct the reduced representation into sequential output data 660. The output module 650 is configured to predict the original sequence encoded data by applying dense layers to each output of the decoder module. If the predicted original sequence sufficiently matches the actual original sequence (e.g., based on the criteria mentioned above), the reduced representation 630 may be utilized for comparison with other agents and/or to determine whether a particular agent-specific set of data is indicative of abnormal or potentially fraudulent behavior.

The encoder and decoder modules can be a recurrent neural network or a recurrent neural network with long short-term memory units or a recurrent neural network with gated recurrent units. The direction of the units could be forward, backward or both. The encoder and decoder layers can be also implemented by using a convolutional neural network as the encoder and an up-sampling layer as the decoder. Implementations utilizing a convolutional autoencoder approach may require less resources for training, but may incorporate less sequential history in the compressed representation.

Figure 7:
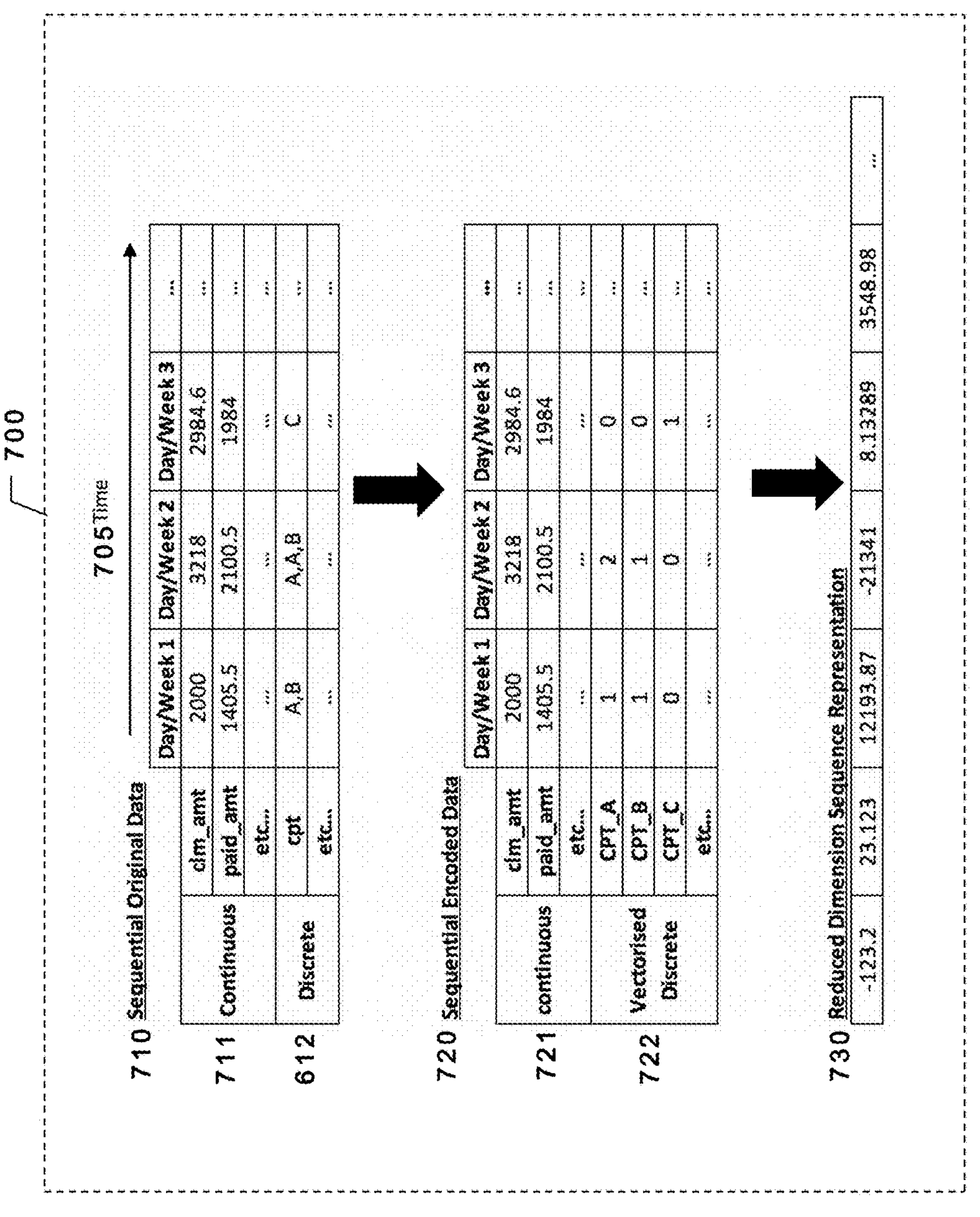
FIG. 7 graphically illustrates data transformation steps utilized in accordance with various embodiments.

FIG. 7 provides example data 700 illustrating the results of various processes leading to the dimensionality reduction for a particular agent. An example of the process for compressing the original sequential data 710 recorded over time 705 into a reduced dimension sequence representation 730 by first extracting the original continuous 711 and discrete 712 feature values, vectorizing the extracted discrete feature values 722 using for example, multi-hot-encoding to construct the sequential encoded data 720 representation of continuous 721 and vectorized discrete 722 feature values. The reduced dimension sequence representation 730 is the behavior vector resulting from the sequential encoder (and optional auto-encoder). The behavior vector can be any length such that it captures the sequential original data 710. The sequential original data 710 corresponds to Sequential Original Data 605 in FIG. 6, sequential encoded data 720 corresponds to the output of feature vectorization layer 610 and reduced dimension sequence representation 730 corresponds to the output of encoder module 620.

D. Comparison and Abnormality Detection

With reference again briefly to FIG. 4, the reduced dimensional vector for a particular agent is compared against other reduced dimensional vectors for other agents to identify potentially abnormal behavior represented by a particular one of the reduced dimensional vectors, for example, via a comparison unit 125. Such comparisons may utilize clustering techniques, machine-learning classification techniques (e.g., utilizing supervised training data utilized to identify abnormal or fraudulent behavior), and/or the like. In certain embodiments, any of a variety of clustering techniques may be utilized, including k-means clustering, Expectation Maximization, DBSCAN algorithm, and/or the like. Such clustering mechanisms may in certain embodiments uncover fraudulent behavior not previously detected utilizing preexisting fraud detection systems. This will enable the discovery of fraudulent behaviors which are tailored to avoid detection by traditional example-based algorithms.

After the clustering component has assigned each agent to a cluster, this component may evaluate the clusters to determine which clusters represent abnormal behavior. One method is to flag the smallest sized (fewest agents) clusters as representative of abnormal behavior. This works because clustering would assign agents with the same sequential behaviors to the same clusters. Agents with sequential behaviors which do not conform to typical behaviors will appear in their own clusters. These small clusters of agents can then be reviewed (e.g., manually) for actual fraudulent behavior. When the review of this agent is complete, resulting ground-truth fraudulent/non-fraudulent indicators may be provided and used in classification models to more accurately predict whether a particular agent (or a cluster of agents) is reflective of potentially fraudulent behavior.

In certain embodiments, the comparison unit 125 may be configured to simultaneously compare all agents for which data is stored. In other embodiments, the comparison unit 125 may be configured to compare data for agents having shared characteristics. As discussed herein, agent data may comprise data indicative of characteristics of specific agents, such that agents having common agent characteristics may be identified and compared. For example, agents within a particular region may be compared; agents having a specific specialty may be compared; and/or the like. In certain embodiments, the portion of agents to be compared may be selected based on user input (e.g., provided to an external computing entity 131 and provided to the data analytics system 101).

Very skilled fraudulent agents who have assumed sequential behavior which closely matches real agents may appear in a majority, non-fraud cluster. Hence, certain embodiments also perform outlier detection within each cluster. This will unveil which agents within a cluster are exhibiting behavior which significantly deviates from the other agents in that cluster. These outliers can be detected by using probabilistic methods (probability of an agent being non-fraudulent based on density estimates, for example from an expectation-maximization-trained model), Isolation forests, DBSCAN outliers, Interquartile ranges, and/or the like. Again, these suspected fraudulent agents can be reviewed (e.g., manually) and labelled as fraudulent/non-fraudulent for the future.

Figure 8:
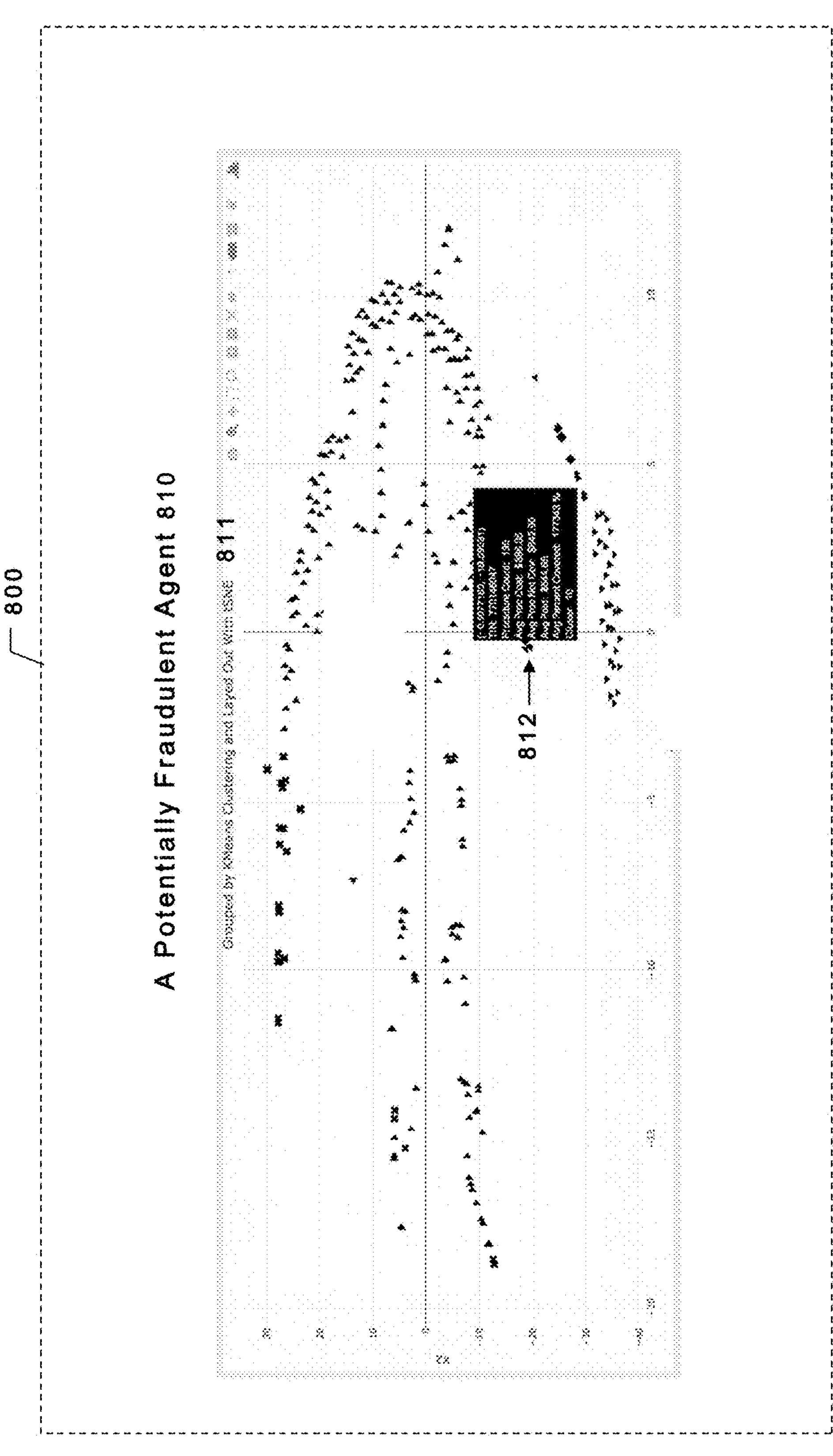
FIGS. 8-10 graphically illustrate example output graphical user interfaces according to various embodiments.
Figure 9:
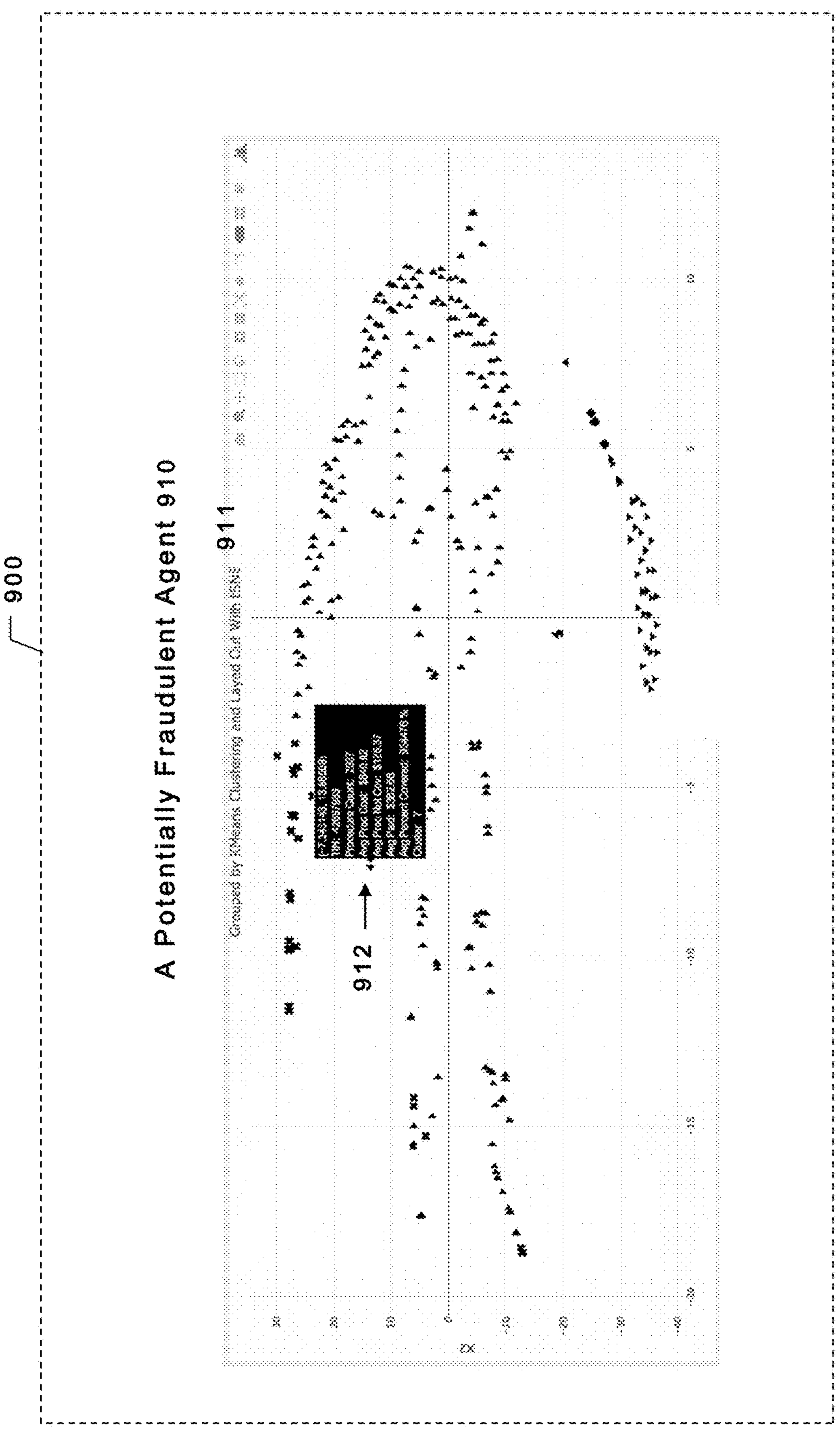
Figure 10:
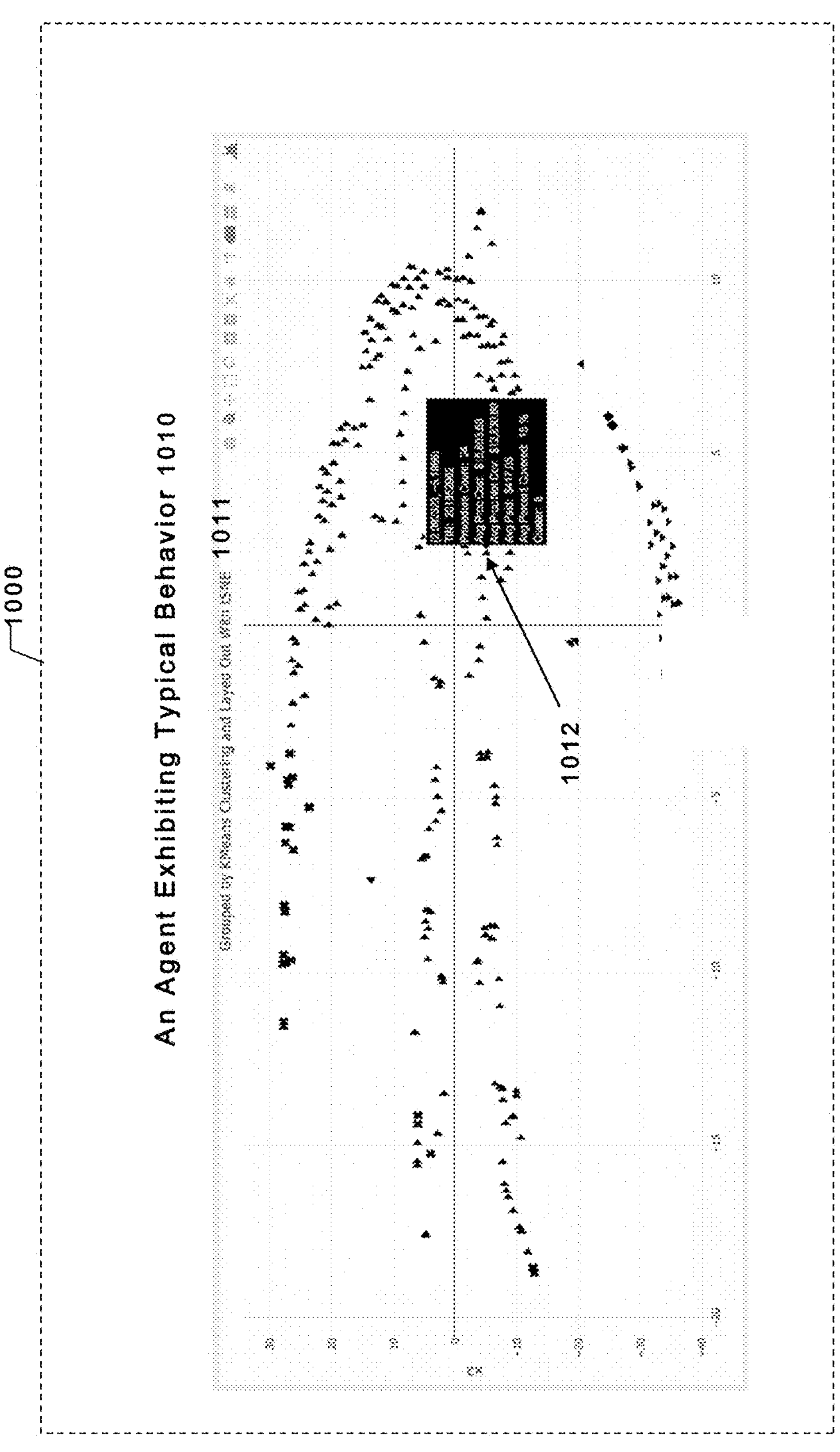

Examples of detection of fraudulent agent groups are shown in the graphical illustrations 800, 900, and 1000 of FIGS. 8-10, respectively. In the illustrations of FIGS. 8-10, a reduced dimensionality vector for each agent is represented as a dot in these figures, and each figure shows the details for a chosen agent in different groupings. For example, FIG. 8 shows a potentially fraudulent agent graph 810 where the agents are grouped by k-means clustering and plotted with tSNE 811. The fraudulent agent is reflected at 812. FIG. 9 shows another potentially fraudulent agent graph 910 where the agents were grouped by k-means clustering and plotted with tSNE 911. The potentially fraudulent agent is 912. Both agents 812 and 912 are identified as potentially fraudulent because they appear in smaller, outlier groups as they differ significantly from typical behavior. FIG. 10 shows a plot highlighting an agent exhibiting typical behavior 1010, where the agents are grouped by k-means clustering and plotted with tSNE 1011. The highlighted agent is shown at 1012 and the agent is in the largest group to which the majority of agents belong.

Graphical output graphics such as those shown in FIG. 8-10 may be provided to external computing entities 131 requesting analyses as discussed herein. Moreover, such graphics may be interactive, with hovering of a mouse over a particular dot (reflecting a particular agent) provides detailed data regarding the agent via a tooltip popup similar to that shown in FIGS. 8-10. The tooltip popup may comprise data such as agent identifier data, data reflective of one or more values within the reduced dimensional sequence representation, and/or the like.

An alternative to performing the clustering and outlier determination processes as discussed above would be to use an ML classifier to predict whether an agent is fraudulent. Such configurations utilize examples of known fraudulent agents and known non-fraudulent agents. The classifier may then be trained on this training data to translate from the Reduced Dimension Sequential Representation of a given agent's submission behavior to a prediction of whether the agent is fraudulent. The tradeoff in that method is that it requires sufficient training data to represent all major potential fraudulent behavior, whereas the clustering and outlier determination processes enable a user to discover new fraudulent agent behavior.

E. Training

At least one component of the data analysis subsystem may be trained using a method that optimizes parameters of the component to minimize an error function and/or maximize a utility function associated with the performance of the component. For example, a component may be trained using a training method that uses a gradient descent training method.

In certain embodiments, various components may be trained using a training algorithm that uses backpropagation (or an advanced neural network training algorithm) to train the embeddings and/or sequential (or convolutional) encoder. In embodiments utilizing clustering techniques, a clustering algorithm may be utilized to train various components, such as the embeddings and/or sequential (or convolution encoder). In embodiments utilizing a classifier for fraudulent agent detection, classification data (e.g., fraudulent agent data and non-fraudulent agent data) may be provided and utilized for training various components.

As an example of certain embodiments, the feature extraction subunit may be trained by: (i) generating a group of processed feature values based on a set of original feature values; (ii) providing the group of processed feature values to a machine learning model within the training unit; (iii) identifying a first prediction value by the prediction unit generated using the prediction unit; (iv) identifying a training prediction value which in this case is the copy of sequential representation 1, for the each agent in the group of agents represented by the set of training feature values; (v) computing a measure of deviation between the training prediction value and the first prediction value; (vi) determining one or more desired parameters for the feature extraction unit using the measure of deviation and a gradient of an error function associated with the performance of the data analytics subsystem.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:

receiving, by one or more processors, a set of agent-specific data, wherein first agent-specific data of the set of agent-specific data (i) is associated with a given agent of a plurality of agents associated with the set of agent-specific data and (ii) comprises (a) first continuous feature data comprising one or more continuous values for the given agent and (b) first discrete feature data for the given agent;

encoding, by the one or more processors, a set of discrete feature data associated with the set of agent-specific data into a set of discrete feature vectors, wherein the set of discrete feature data comprises the first discrete feature data and encoding the first discrete feature data comprises encoding at least part of the first discrete feature data into one or more discrete feature vectors that are a subset of the set of discrete feature vectors;

generating, by the one or more processors and using a sequential machine learning model, a set of sequential feature vectors based at least in part on the set of discrete feature vectors and continuous features data associated with the set of agent-specific data;

reducing, by the one or more processors, dimensionality of the set of sequential feature vectors to generate a set of dimensionality-reduced behavior vectors associated with the plurality of agents;

assigning, by the one or more processors, the set of dimensionality-reduced behavior vectors to a plurality of clusters based at least in part on determining distances between respective ones of the set of dimensionality-reduced behavior vectors;

determining, by the one or more processors and from among the plurality of clusters, at least one non-fraudulent cluster that contains an agent, of the plurality of agents, associated with a dimensionality-reduced behavior vector of the set of dimensionality-reduced behavior vectors;

determining, by the one or more processors and based at least in part on applying outlier detection to dimensionality-reduced behavior vector assigned to the agent contained in the at least one non-fraudulent cluster, that the dimensionality-reduced behavior vector should be associated with a fraudulent agent based at least in part on the dimensionality-reduced behavior vector deviating from a center of the at least one non-fraudulent cluster by a given distance;

generating, by the one or more processors, instructions to display a representation of the agent contained in the at least one non-fraudulent cluster as fraudulent; and transmitting, by the one or more processors, the instructions to a user device.

2. The computer-implemented method of claim 1, wherein organization of the set of dimensionality-reduced behavior vectors is determined using a supervised learning algorithm or an unsupervised learning algorithm.

3. The computer-implemented method of claim 1, wherein the plurality of agents is grouped using a filter system.

4. The computer-implemented method of claim 3, wherein the filter system groups the plurality of agents by industry type.

5. The computer-implemented method of claim 1, wherein the encoding comprises at least one of: fixed embeddings lookup, embeddings initialization and evolution during model training, target encoding, one-hot-encoding, or feature hashing.

6. A system comprising one or more processors and at least one memory storing processor-executable instructions that, when executed by the one or more processors, cause the one or more processors to perform operations comprising:

receiving a set of agent-specific data, wherein first agent-specific data of the set of agent-specific data (i) is associated with a given agent of a plurality of agents associated with the set of agent-specific data and (ii) comprises (a) first continuous feature data comprising one or more continuous values for the given agent and (b) first discrete feature data for the given agent;

encoding a set of discrete feature data associated with the set of agent-specific data into a set of discrete feature vectors, wherein the set of discrete feature data comprises the first discrete feature data and encoding the first discrete feature data comprises encoding at least part of the first discrete feature data into one or more discrete feature vectors that are a subset of the set of discrete feature vectors;

generating, using a sequential machine learning model, a set of sequential feature vectors based at least in part on the set of discrete feature vectors and continuous features data associated with the set of agent-specific data;

reducing dimensionality of the set of sequential feature vectors to generate a set of dimensionality-reduced behavior vectors associated with the plurality of agents;

assigning one or more of the set of dimensionality-reduced behavior vectors to one or more of a plurality of clusters based at least in part on determining distances between respective ones of the set of dimensionality-reduced behavior vectors;

determining, from among the plurality of clusters, at least one non-fraudulent cluster that contains an agent, of the plurality of agents, associated with a dimensionality-reduced behavior vector of the set of dimensionality-reduced behavior vectors;

determining, based at least in part on applying outlier detection to the dimensionality-reduced behavior vector assigned to the agent contained in the at least one non-fraudulent cluster, that the dimensionality-reduced behavior vector should be associated with a fraudulent agent based at least in part on the dimensionality-reduced behavior vector deviating from a center of the at least one non-fraudulent cluster by a given distance;

generating instructions to display a representation of the agent contained in the at least one non-fraudulent cluster as fraudulent; and transmitting the instructions to a user device.

7. The system of claim 6, wherein organization of the set of dimensionality-reduced behavior vectors is determined using a supervised learning algorithm or an unsupervised learning algorithm.

8. The system of claim 6, wherein the plurality of agents is grouped using a filter system.

9. The system of claim 8, wherein the filter system groups the plurality of agents by industry type.

10. The system of claim 6, wherein the encoding comprises at least one of: fixed embeddings lookup, embeddings initialization and evolution during model training, target encoding, one-hot-encoding, or feature hashing.

11. One or more non-transitory computer readable storage media including instructions that, when executed by one or more processors, cause the one or more processors to perform operations comprising:

receiving a set of agent-specific data, wherein first agent-specific data of the set of agent-specific data (i) is associated with a given agent of a plurality of agents associated with the set of agent-specific data and (ii) comprises (a) first continuous feature data comprising one or more continuous values for the given agent and (b) first discrete feature data for the given agent;

encoding a set of discrete feature data associated with the set of agent-specific data into a set of discrete feature vectors, wherein the set of discrete feature data comprises the first discrete feature data and encoding the first discrete feature data comprises encoding at least part of the first discrete feature data into one or more discrete feature vectors that are a subset of the set of discrete feature vectors;

generating, using a sequential machine learning model, a set of sequential feature vectors based at least in part on the set of discrete feature vectors and continuous features data associated with the set of agent-specific data;

reducing dimensionality of the set of sequential feature vectors to generate a set of dimensionality-reduced behavior vectors associated with the plurality of agents;

assigning one or more of the set of dimensionality-reduced behavior vectors to one or more of a plurality of clusters based at least in part on determining distances between respective ones of the set of dimensionality-reduced behavior vectors;

determining, from among the plurality of clusters, at least one non-fraudulent cluster that contains an agent, of the plurality of agents, associated with a dimensionality-reduced behavior vector of the set of dimensionality-reduced behavior vectors;

determining, based at least in part on applying outlier detection to the dimensionality-reduced behavior vector assigned to the agent contained in the at least one non-fraudulent cluster, that the dimensionality-reduced behavior vector should be associated with a fraudulent agent based at least in part on the dimensionality-reduced behavior vector deviating from a center of the at least one non-fraudulent cluster by a given distance;

generating instructions to display a representation of the agent contained in the at least one non-fraudulent cluster as fraudulent; and transmitting the instructions to a user device.

12. The one or more non-transitory computer readable storage media of claim 11, wherein organization of the set of dimensionality-reduced behavior vectors is determined using a supervised learning algorithm or an unsupervised learning algorithm.

13. The one or more non-transitory computer readable storage media of claim 11, wherein the plurality of agents is grouped using a filter system.

14. The one or more non-transitory computer readable storage media of claim 13, wherein the filter system groups the plurality of agents by industry type.

15. The one or more non-transitory computer readable storage media of claim 11, wherein the encoding comprises at least one of: fixed embeddings lookup, embeddings initialization and evolution during model training, target encoding, one-hot-encoding, or feature hashing.

16. The computer-implemented method of claim 1, wherein the dimensionality of the set of sequential feature vectors is reduced by:

translating, using an auto-encoder machine learning model, one or more internal behavior vectors through a minimized representation feed forward network; and generating the set of dimensionality-reduced behavior vectors based at least in part on the minimized representation feed forward network.

17. The system of claim 6, wherein the dimensionality of the set of sequential feature vectors is reduced by:

translating, using an auto-encoder machine learning model, one or more internal behavior vectors through a minimized representation feed forward network; and generating the set of dimensionality-reduced behavior vectors based at least in part on the minimized representation feed forward network.

18. The one or more non-transitory computer readable storage media of claim 11, wherein the dimensionality of the set of sequential feature vectors is reduced by:

translating, using an auto-encoder machine learning model, one or more internal behavior vectors through a minimized representation feed forward network; and generating the set of dimensionality-reduced behavior vectors based at least in part on the minimized representation feed forward network.

19. The computer-implemented method of claim 1, wherein the dimensionality of the set of sequential feature vectors is reduced by:

generating, using a sequence encoder machine learning model and based at least in part on the set of sequential feature vectors, one or more internal behavior vectors;

generating, using a sequence decoder machine learning model and based at least in part on the one or more internal behavior vectors, one or more reconstructed sequential feature vectors;

determining a dimensionality reduction accuracy measure based at least in part on a comparison measure for the one or more reconstructed sequential feature vectors and one or more of the set of sequential feature vectors; and responsive to determining that the dimensionality reduction accuracy measure satisfies a dimensionality reduction accuracy measure threshold, generating the set of dimensionality-reduced behavior vectors based at least in part on the one or more internal behavior vectors.

20. The system of claim 6, wherein the dimensionality of the set of sequential feature vectors is reduced by:

generating, using a sequence encoder machine learning model and based at least in part on the set of sequential feature vectors, one or more internal behavior vectors;

generating, using a sequence decoder machine learning model and based at least in part on the one or more internal behavior vectors, one or more reconstructed sequential feature vectors;

determining a dimensionality reduction accuracy measure based at least in part on a comparison measure for the one or more reconstructed sequential feature vectors and one or more of the set of sequential feature vectors; and responsive to determining that the dimensionality reduction accuracy measure satisfies a dimensionality reduction accuracy measure threshold, generating the set of dimensionality-reduced behavior vectors based at least in part on the one or more internal behavior vectors.

21. The one or more non-transitory computer readable storage media of claim 11, wherein the dimensionality of the set of sequential feature vectors is reduced by:

generating, using a sequence encoder machine learning model and based at least in part on the set of sequential feature vectors, one or more internal behavior vectors;

generating, using a sequence decoder machine learning model and based at least in part on the one or more internal behavior vectors, one or more reconstructed sequential feature vectors;

determining a dimensionality reduction accuracy measure based at least in part on a comparison measure for the one or more reconstructed sequential feature vectors and one or more of the set of sequential feature vectors; and responsive to determining that the dimensionality reduction accuracy measure satisfies a dimensionality reduction accuracy measure threshold, generating the set of dimensionality-reduced behavior vectors based at least in part on the one or more internal behavior vectors.

22. The computer-implemented method of claim 1, wherein the outlier detection is based at least in part on one or more density estimates from an expectation-maximization-trained model, one or more isolation forests, one or more DBSCAN outliers, or one or more interquartile ranges.

* * * * *